United States Patent

[11] 3,582,871

| [72] | Inventor | Morris Snyder<br>Philadelphia, Pa. |
|---|---|---|
| [21] | Appl. No. | 099,965 |
| [22] | Filed | Mar. 31, 1961 |
| [45] | Patented | June 1, 1971 |
| [73] | Assignee | The United States of America as represented by the Secretary of the Navy |

[54] ELLIPTICAL COMPUTER SYSTEM
7 Claims, 2 Drawing Figs.

| [52] | U.S. Cl. | 340/2, 235/180, 340/3 |
|---|---|---|
| [51] | Int. Cl. | G01s 9/66 |
| [50] | Field of Search | 235/180, 184, 186; 340/2, 6, 3, 1; 343/10, 11, 112.1 |

[56] References Cited

UNITED STATES PATENTS

| 2,763,857 | 9/1956 | Nalley, Jr. | 343/103 |
| 2,910,665 | 10/1959 | Hawkins | 340/2 |

FOREIGN PATENTS

| 844,059 | 8/1960 | Great Britain | 235/186 |

Primary Examiner—Richard A. Farley
Attorneys—Henry Hansen and R. S. Sciascia

CLAIM: 2. An elliptical computer system for determining the position of a submarine, comprising in combination: a first elliptical computer, a first input means for inserting into said first elliptical computer a voltage proportional to the direct distance between foci of a first ellipse, said foci of said first ellipse being the locations of a sonobuoy and a first charge dropped in sequence by an aircraft, a second input means for inserting into said first elliptical computer a voltage proportional to the difference between the distance from said first charge to said sonobuoy measured by way of a submarine and the direct distance between said sonobuoy and said first charge; a second elliptical computer, a first input means for inserting into said second elliptical computer a voltage proportional to the distance between foci of a second ellipse, said foci of said second ellipse being the locations of said sonobuoy and a second charge dropped by said aircraft, a second input means for inserting into said second elliptical computer a voltage proportional to the difference between the distance from said second charge to said sonobuoy measured by way of said submarine and the direct distance between said sonobuoy and said second charge, common input means for inserting into said first and said second elliptical computer a voltage proportional to the angle between the line connecting said sonobuoy and said first charge and a line connecting said sonobuoy and said first charge and a line extending from said sonobuoy, means for varying said common input voltage from a zero reference equivalent to a value of 0° for said angle, calibrating means for determining the amount of variance of said common input voltage, said first and second elliptical computers each having a voltage output variable with said common input voltage, comparison means having a first input connected to said first elliptical computer output and a second input connected to said second elliptical computer output, means connected to said comparison means for indicating zero comparison means output voltage when said first and second elliptical computer outputs are equal for a particular value of said common input voltage whereby values of said angle for which said computer outputs are equal are indicated on said calibrating means.

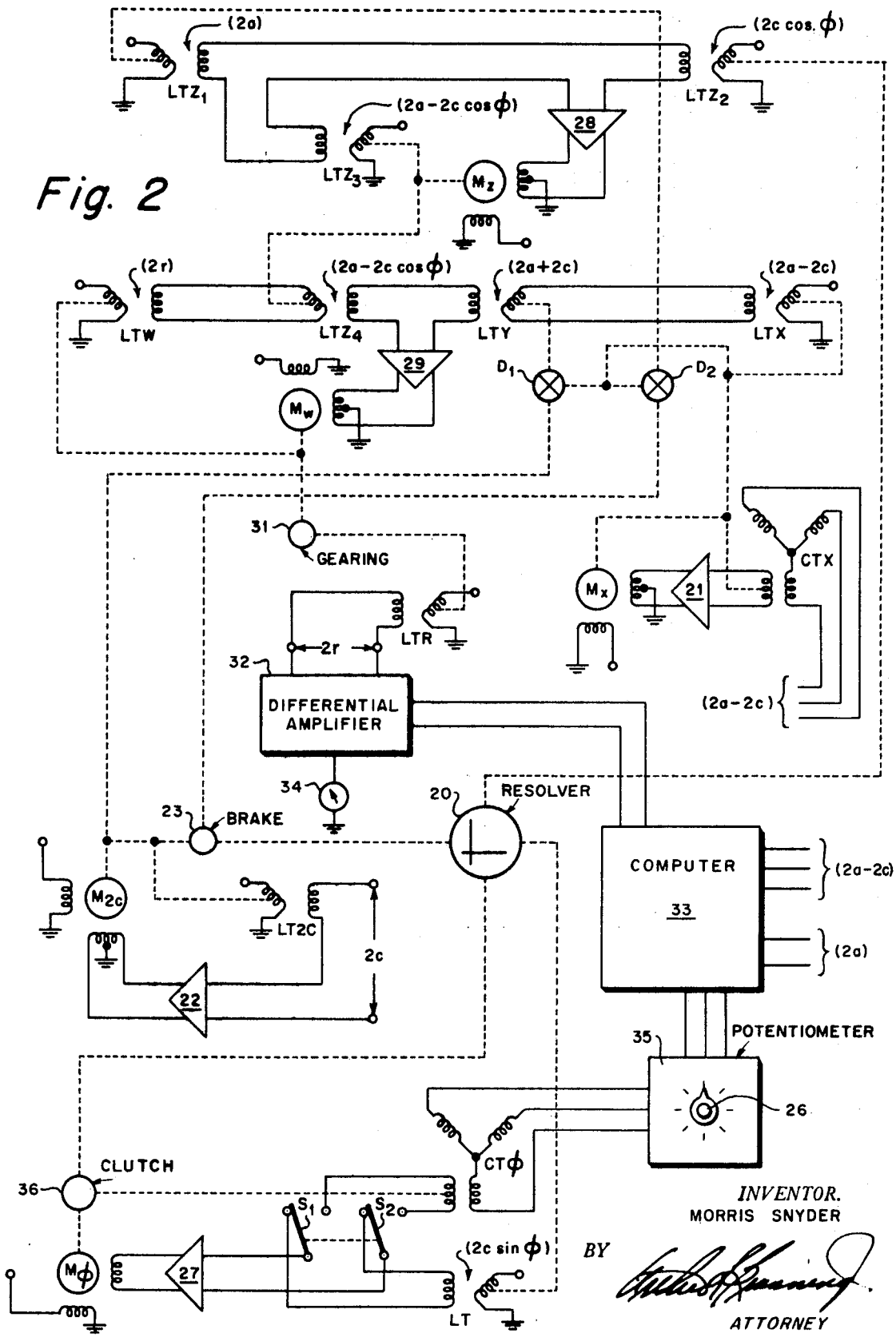

ELLIPTICAL COMPUTER SYSTEM

The invention described herein may be manufactured and used by or for the Government of the United States of America for governmental purposes without the payment of any royalties thereon or therefor.

This invention relates to submarine locating equipment and more particularly to an elliptical computer system for the location of enemy submarines.

Various methods for locating submarines are constantly being developed for use by aircraft, floating craft, and underwatercraft. One of the most effective methods for locating submarines involves the use of aircraft, in which all the submarine locating equipment must be airborne. Most of the present day airborne submarine locating equipment requires highly trained operators, elaborate electronic systems, and constantly repeated aircraft maneuvers.

The present invention contemplates an elliptical computer system for determination of the location of a target submarine, which requires less complicated equipment, is easier to operate, and does not require the aircraft to constantly reorient itself with respect to a known marker position.

The present invention contemplates the use of two elliptical computers for the simultaneous solution of the equations for two ellipses having a common foci as determined by a dropped sonobuoy marker. When an aircraft drops a sonobuoy marker in the approximate area of a target submarine and then after a short time drops a charge, the distance between the charge and the sonobuoy determines the distance between the foci of one ellipse. Using the same sonobuoy as one of the foci, the aircraft drops a second charge to determine a second ellipse. The two ellipses are solved simultaneously to determine the points of intersection. The points of intersection are plotted manually or electronically as in a cathode-ray tube. From the geometry of the problem it is known that the target submarine is located at one or the other of these two intersection points. All that is necessary is to determine the proper one. This may be done by solving a third ellipse using the same marker as one of the foci or simply by flying over each intersection point in turn and using magnetic detection equipment to determine target position.

An object of the present invention is the provision of a submarine detector and locating system.

Another object of the present invention is to provide two elliptical computers identical in structure and specifically designed for the simultaneous solution of two elliptical equations of two ellipses having a common focus.

A further object of the invention is the provision of a computer system for enabling a pilot to accurately determine points of intersection of two ellipses having a common focus.

Still another object of the present invention is the provision of a computer system which is operative to provide target position relative to a known marker position, and which is operative to pin point an enemy submarine quickly and without the necessity of the detecting aircraft constantly reorienting itself with respect to a known position.

Other objects and features of the invention will become apparent to those skilled in the art as the disclosure is made in the following detailed description of this invention as illustrated in the accompanying drawing in which:

FIG. 2 is an illustration partly in schematic and partly in block diagram form of the elliptical computer system of this invention.

Figure 1:
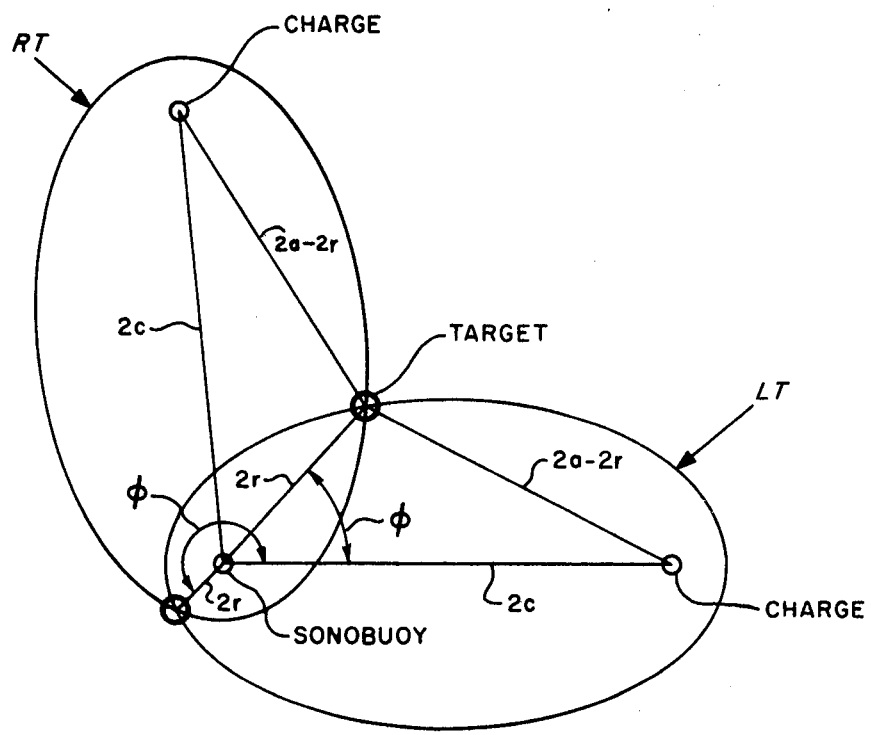
FIG. 1 is a representation of the elliptical relationships involved in this invention.

Referring more particularly to FIG. 1, there are shown two ellipses which are formed by a submarine detector and locater aircraft which drops a sonobuoy into the water at the approximate target area. The sonobuoy is used as one focus for both ellipses. A predetermined time later the aircraft drops a charge. The distance between the sonobuoy and the charge is the distance $2c$ between the foci of a first ellipse. When the charge is exploded, the distances $2c$ and $2a-2c$ are determined. The distance $2c$ is determined by the time interval between detonation of the charge and the arrival of the sound at the sonobuoy, which is transmitted to the aircraft. The distance $2a-2c$ is measured in the form of the time interval between the arrival of the reflected sound from the target and the arrival of the sound directly from the charge as picked up by the sonobuoy. Since the direction from the sonobuoy to the target is not known, immediate location of the target is not possible. However, the aircraft proceeds to a second point and drops a charge which upon detonation will determine a second ellipse which also uses the position of the sonobuoy as a focus. The second ellipse intersects the first ellipse at at least two points, one of which is the target position.

From geometry it is known that ellipses having a common focus have points of intersection at the points on the periphery of each ellipse where the lines extending from the common focus to the periphery of the ellipses are equal.

Each ellipse has two known quantities, namely, $2c$ and $2a-2c$, and two unknown quantities, namely, $2r$ and $\Phi$. $2r$ is the distance from sonobuoy to target and $\Phi$ is the angle between the lines extending from sonobuoy to target and sonobuoy to charge. The two equations for the respective ellipses are solved simultaneously to give values of $2r$ which are equal for both ellipses and thereby determine the points of intersection of the ellipses. Once the two points are known and plotted, actual location of the target may be determined. The ASW aircraft equipped with a magnetic detector device simply flies over each of the positions and the magnetic detection device will indicate whether it is flying over target. Alternately, a third ellipse using the same sonobuoy as one focus may be used for determining the position of the target.

FIG. 2 is an illustration of the computers used to solve the simultaneous equations of the ellipses to determine the values for $\Phi$ at which the distances $2r$ for each ellipse are equal. Since the elliptical computers used are identical, only one is shown fully, while the other is shown in block form. Each individual computer receives the known inputs for one of the ellipses. The elliptical computer shown in schematic form receives inputs representative of distances $2c$ and $2a-2c$ of ellipse LT. The elliptical computer shown in block form receives inputs representative of distances $2c$ and $2a-2c$ of ellipse RT.

A voltage representative of the distance $2a-2c$ is put into control transformer CTX, the output of which is amplified in amplifier 21 and serves as an input to synchro motor Mx, which rotates to drive the rotor of transformer CTX to null the output of transformer CTX. The voltage representative of the distance $2a-2c$, which is converted into mechanical form in synchro motor Mx, is put into mechanically summing differentials $D_1$ and $D_2$. At the same time the rotor of linear transformer LTX is positioned an amount proportional to the distance $2a-2c$ by motor Mx.

The voltage proportional to the distance $2c$ is an input to linear transformer LT2C and also to synchro motor M2C through amplifier 22. The output from amplifier 22 causes the rotor of transformer LT2C to null out the signal representative of $2c$. At the same time, the motor $M_{2c}$ transmits the voltage proportional to distance $2c$ in mechanical form to the differential $D_1$, where it is doubled and added to the distance $2a-2$ previously inserted in differential $D_1$. The output of differential $D_1$ is mechanical and representative of the distance $2a+2$ and positions the rotor of transformer LTY accordingly. The mechanical output of motor $M_{2c}$ also provides an input representative of the distance $2c$ to differential $D_2$. Differential $D_2$ adds the distance $2a-2c$ to the distance $2c$, which results in a mechanical output from differential $D_2$ representative of $2a$. This output representative of the distance $2a$ positions the rotor of linear transformer $LTZ_1$. The output from motor $M_{2c}$ is also applied to a mechanical resolver 20 through a brake 23.

In this way the parameters of the ellipse LT are inserted into the LT elliptical computer.

The parameters of the ellipse RT are inserted into the elliptical computer RT which functions in a manner identical with that discussed in relation to the elliptical computer for ellipse LT.

Each computer has a variable input representative of the angle $\Phi$ as it varies from 0° to 360°. For purposes of this invention the angle $\Phi$ is the angle formed by the line connecting foci of the ellipse LT and a line which revolves about the sonobuoy. For two values of this angle, it may be seen by reference to FIG. 1 that the line $2r$ of ellipse LT and the line $2r$ of ellipse RT will be equal. Thus, the two values of $\Phi$ determine the points of intersection between the two ellipses.

A variable voltage is supplied to synchro transformer CT$\Phi$ by turning the knob 26 which is connected mechanically to the rotor shaft of a synchro transmitter. One purpose of synchro transformer CT$\Phi$ is to insure a reference starting point for the voltage representative of the angle $\Phi$. When knob 26 of potentiometer 35 is pointing at the 0° mark, the voltage in the stator of transformer LT should be zero while the voltage in the stator of linear transformer $LTZ_2$ should be at a maximum. When there is any voltage in the stator of linear transformer LT it is known that knob 26 is not correctly calibrated. Linear transformer LT is simply a device for determining whether linear transformer $LTZ_2$ has a maximum voltage in its stator. It is known that linear transformer $LTZ_2$ does have a maximum voltage in its stator when linear transformer LT has no voltage at all across its stator. Thus, when switches $S_1$ and $S_2$ are in the position shown motor M$\Phi$ automatically changes the rotors of linear transformers LT and $LTZ_2$ to insure that linear transformer LT will have no voltage in its stator when knob 26 of potentiometer 35 is pointing to 0°. In this way one can start varying the angle $\Phi$ from 0° to 360°.

With knob 26 fixed, LT ($2c$ sin $\Phi$) will, when switches $S_1$ and $S_2$ are in the position shown, transmit through amplifier 27 a signal representative of $2c$ sin $\Phi$ to motor M$\Phi$ which converts the voltage representative of the angle $\Phi$ into mechanical form and inserts it into mechanical resolver 20 through a clutch 36. As a result of its other input representative of distance $2c$ the mechanical resolver will have two mechanical outputs. One of these outputs which is representative of quantity $2c$ cos $\Phi$ positions transformer $LTZ_2$. The other output of mechanical resolver 20 is representative of $2c$ sin $\Phi$ and positions the rotor of transformer LT accordingly. The object here is to rotate resolver 20 until quantity $2c$ cos $\Phi$ is at a maximum and the quantity $2c$ sin $\Phi$ is at a minimum. When this occurs, it is known that the angle $\Phi$ is at reference zero. At this time, switches $S_1$ and $S_2$ are switched into the position opposite from that shown. The potentiometer box 35 is calibrated in degrees and once $\Phi=0$ has been determined, the values of $\Phi$ for which the $2r$ distances are equal are simply read off.

The transformer $LTZ_2$ supplies a signal through amplifier 28 to motor $M_z$ the output of which positions the rotors of the linear transformers $LTZ_3$ and $LTZ_4$. Transformer $LTZ_1$ has a voltage on its secondary representative of the distance $2a$ which is transmitted to the stator of the $LTZ_3$ transformer and at the same time forms part of the input to motor $M_z$. As a result, the quantities $2a$ and $2c$ cos $\Phi$ are subtracted and the rotor of transformer $LTZ_4$ is positioned an amount proportional to the quantity $2a-2c$ cos $\Phi$.

The solution of the elliptical equation for ellipse LT is accomplished by balancing the product of transformers LTY and LTX against the product of transformers $LTZ_4$ and LTW in amplifier 29. To accomplish this multiplication of $LTZ_4$ by LTW the output from LTW is made the input of LTZ by connecting the stator of LPW to the rotor of LTZ. The signal from the amplifier 29 drives motor $M_w$ which drives the rotor of linear transformer LTW until there is a balance between the two products. Motor $M_w$ also drives the linear transformer LTR at half the speed it drives LTW through reduction gearing 31. The output from transformer LTR is representative of the distance $2r$ between the sonobuoy and the periphery of the ellipse LT for every value of $\Phi$ as $\Phi$ is varied and is an input to differential amplifier 32. Since the angle $\Phi$ is being continuously varied, this input voltage is continuously varying and does not necessarily represent the relative position of the target with respect to the sonobuoy.

The elliptical computer which receives the inputs representative of the distances, $2a$ and $2a-2c$, of the ellipse RT and the same input representative of the angle $\Phi$ as does the elliptical computer for ellipse LT, is identical in structure and function as the elliptical computer for ellipse LT and is represented by box 33 in the figure. Differential amplifier 32 has an input from elliptical computer 33 which is representative of the distance $2r$ from the sonobuoy to the periphery of ellipse RT and this varies with $\Phi$. Clutch 36 operates to prevent nulling of control transformer CT$\Phi$ when switches $S_1$ and $S_2$ are in the positions shown while potentiometer 35 is being calibrated. Brake 23 is used to maintain the mechanical linkage connected between FIG. 23 and mechanical resolver 20 stationary, as for example, during calibration.

The equation to be solved is: $(2r)(2a-2c \cos \Phi) = (2a+2c)(2a-c)$. The mechanization used in this invention forces a solution of this equation by balancing the two products on each side of the above equation. When $\Phi$ is varied by turning knob 26, the mechanical output from motor $M_w$ positions the rotor of transformer LTW. At that value of $\Phi$ at which both sides of the equation are equal motor $M_w$ ceases to be energized and stops. In the meantime, however, it has rotated its output shaft the amount necessary to balance the equation and this amount is proportional to $2r$. This output is transferred through reduction gearing 31 to transformer LTR which provides a voltage output which is an input to differential amplifier 32 which is proportional to $2r$. Elliptical computer 33 likewise provides an input signal to differential amplifier 32 which is proportional to $2r$.

Differential amplifier 32 operates in such a manner as to have zero output when its inputs are equal. This condition of zero output is readily apparent when the ammeter 34 reads zero. Thus, the angle $\Phi$ for which the outputs $2r$ from respective elliptical computers are equal, it determined merely by noting the angle through which knob 26 was turned with respect to its calibrations from the known 0° reference position to produce the zero reading on meter 34.

Since there are at least two angles for which the elliptical computer outputs are zero, the two points on ellipse LT which are intersected by ellipse RT are known when the two values of $\Phi$ are known. These two points may be plotted manually or electronically to give two relative positions, one of which represents the target submarine.

The aircraft can then determine the target position by using magnetic detection equipment.

The entire locating procedure may be continuously repeated to track the path of the submarine if desired.

The elliptical computer system of this invention results in a simple, accurate method for detecting submarines with a minimum of electronic equipment.

Obviously, many modifications and variations of the present invention are possible in the light of the above teachings. It is, therefore, to be understood that within the scope of the appended claims the invention may be practiced otherwise than as described.

What I claim is:

1. A system for determining points of intersection of two ellipses, comprising in combination: a first elliptical computer, means for inserting a first input voltage into said first elliptical computer proportional to the direct distance between foci of a first ellipse, means for inserting a second input voltage into said first elliptical computer proportional to the difference between the distance between the foci measured by way of a point on the periphery of said first ellipse and said direct distance between foci of said first ellipse, a second elliptical computer, means for inserting a first input voltage into said second elliptical computer proportional to the direct distance between foci of a second ellipse, said second ellipse having a focus common with said first ellipse, means for inserting a second input voltage into said second elliptical computer proportional to the difference between the distance between the foci measured by way of a point on the periphery of said second ellipse and said direct distance between foci of said second ellipse, means for inserting a common input voltage into said first and said second elliptical computer proportional to the angle between the line connecting foci of said first ellipse and a line extending from said common focus, means for varying said common input voltage from a zero reference point, said first and second elliptical computers each having a voltage output variable with said common input voltage, detector means connected to said elliptical computer outputs for indicating when said output voltages are equal for a particular value of said common input voltage whereby points of intersection of said first and second ellipses are determined.

2. An elliptical computer system for determining the position of a submarine, comprising in combination: a first elliptical computer, a first input means for inserting into said first elliptical computer a voltage proportional to the direct distance between foci of a first ellipse, said foci of said first ellipse being the locations of a sonobuoy and a first charge dropped in sequence by an aircraft, a second input means for inserting into said first elliptical computer a voltage proportional to the difference between the distance from said first charge to said sonobuoy measured by way of a submarine and the direct distance between said sonobuoy and said first charge; a second elliptical computer, a first input means for inserting into said second elliptical computer a voltage proportional to the direct distance between foci of a second ellipse, said foci of said second ellipse being the locations of said sonobuoy and a second charge dropped by said aircraft, a second input means for inserting into said second elliptical computer a voltage proportional to the difference between the distance from said second charge to said sonobuoy measured by way of said submarine and the direct distance between said sonobuoy and said second charge, common input means for inserting into said first and said second elliptical computer a voltage proportional to the angle between the line connecting said sonobuoy and said first charge and a line extending from said sonobuoy, means for varying said common input voltage from a zero reference equivalent to a value of 0° for said angle, calibrating means for determining the amount of variance of said common input voltage, said first and second elliptical computers each having a voltage output variable with said common input voltage, comparison means having a first input connected to said first elliptical computer output and a second input connected to said second elliptical computer output, means connected to said comparison means for indicating zero comparison means output voltage when said first and second elliptical computer outputs are equal for a particular value of said common input voltage whereby values of said angle for which said computer outputs are equal are indicated on said calibrating means.

3. An elliptical computer system for determining the position of a submarine, comprising in combination: a first elliptical computer, a first input means for inserting into said first elliptical computer a voltage proportional to the direct distance between foci of a first ellipse, said foci of said first ellipse being the locations of a sonobuoy and a first charge dropped in sequence by an aircraft, a second input means for inserting into said first elliptical computer a voltage proportional to the difference between the distance from said first charge to said sonobuoy measured by way of a submarine and the direct distance between said sonobuoy and said first charge; a second elliptical computer, a first input means for inserting into said second elliptical computer a voltage proportional to the direct distance between foci of a second ellipse, said foci of said second ellipse being the locations of said sonobuoy and a second charge dropped by said aircraft, a second input means for inserting into said second elliptical computer a voltage proportional to the difference between the distance from said second charge to said sonobuoy measured by way of said submarine and the direct distance between said sonobuoy and said second charge, common input means for inserting into said first and said second elliptical computers a voltage proportional to the angle between the line connecting said sonobuoy and said first charge and a line extending from said sonobuoy, means connected in said common input means for varying said voltage proportional to said angle from a reference, indicator means associated with said last-mentioned means for determining the amount of variance of said common input voltage in terms of degrees of said angle, each of said elliptical computers having a voltage output variable with said common input voltage, comparison means connected to receive said elliptical computer voltage outputs, said comparison means having an output voltage of zero when said elliptical computer voltage outputs are equal, means connected to said comparison means output for determining the conditions of equal computer output voltages, whereby the values of said angle for which said computer outputs are equal are shown on said indicator means.

4. An elliptical computer system for determining the position of an enemy submarine, comprising in combination: a first elliptical computer, a first input means for inserting into said first elliptical computer a voltage proportional to the direct distance between foci of a first ellipse, said foci of said first ellipse being the locations of a sonobuoy and a first charge dropped in sequence by an aircraft, a second input means for inserting into said first elliptical computer a voltage proportional to the difference between the distance from said first charge to said sonobuoy measured by way of a submarine and the direct distance between said sonobuoy and said first charge; a second elliptical computer, a first input means for inserting into said second elliptical computer a voltage proportional to the direct distance between foci of a second ellipse, said foci of said second ellipse being the locations of said sonobuoy and a second charge dropped by said aircraft, a second input means for inserting into said second elliptical computer a voltage proportional to the difference between the distance from said second charge to said sonobuoy measured by way of said submarine and the direct distance between said sonobuoy and said second charge, common input means for inserting into said first and said second elliptical computers a voltage proportional to the angle between the line connecting said sonobuoy and said first charge and two coincident lines extending from said sonobuoy, one of said lines extending from said sonobuoy to the periphery of said first ellipse, and the other of said lines extending from said sonobuoy to the periphery of said second ellipse, means connecting said common input means for varying said voltage proportional to said angle from a reference equivalent to said angle equal to 0°, indicator means associated with said means for determining the amount said common input voltage is varied in terms of degrees of said angle, each of said elliptical computers having a voltage output proportional to the length of a respective one of said coincident lines for each value of said common input voltage, comparison means connected to receive said elliptical computer voltage outputs, means included in said comparison means for indicating the condition of said elliptical computer voltage outputs being equal, whereby the values of said angle for which said computer outputs are equal are shown on said indicator means.

5. In an elliptical computer system for locating submarines, an electromechanical elliptical computer, comprising in combination: a first linear transformer having a stator and a rotor, a second linear transformer having a stator and a rotor, said first linear transformer stator connected in electrical series with said second linear transformer rotor, said first linear transformer rotor having a mechanical input proportional to a distance $2a-2c$, where $2c$ is the direct distance between foci of an ellipse, said foci being the locations of a sonobuoy and a charge dropped by an aircraft and $2a$ is the distance from said charge to said sonobuoy measured by way of a point on said ellipse, said second linear transformer rotor having a mechanical input proportional to a distance $2a+2c$, a third linear transformer having a stator and a rotor, a fourth linear transformer having a stator and rotor, said fourth linear transformer stator connected in electrical series with said third linear transformer rotor, said third linear transformer rotor having a variable input proportional to the distance $2a-2c \cos \Phi$, said second linear transformer stator having a voltage induced therein proportional to the product of $2a+2c$ and $2a-2c$, said fourth linear transformer rotor having a mechanical input proportional to a distance $2r$, said third linear transformer stator having induced therein a voltage proportional to the product $2r$ and $2a-2c \cos \Phi$, where $2r$ is the distance from said sonobuoy to said point on said ellipse and $\Phi$ is the angle between a line connecting said foci and a line extending from said sonobuoy to said point on said ellipse, a motor having an input proportional to the quotient of the voltage in said third linear transformer stator and the voltage in said second linear transformer stator, said motor having a mechanical output for positioning said fourth linear transformer rotor for nulling the input to said motor, said motor having a second mechanical output, a fifth linear transformer having a stator and a rotor, said fifth linear transformer rotor being positioned by said mechanical output from said motor, said fifth linear transformer stator having induced therein a voltage proportional to the distance $2r$ for each value of $\Phi$.

6. An elliptical computer, comprising in combination: first means for obtaining the product of a voltage proportional to a distance $2a-2c$ and of a voltage proportional to a distance $2a+2$ where $2c$ is the direct distance between foci of an ellipse and $2a$ is the distance from one of said foci to the other of said foci measured by way of a point on said ellipse, second means for obtaining the product of a voltage proportional to a distance $2r$ and of a voltage proportional to a distance $2a-2c \cos \Phi$, where $2r$ is the distance from the other of said foci to said point on said ellipse and $\Phi$ is the angle between a line connecting said foci and a line connecting said other of said foci to said point on said ellipse, third means for varying the voltage proportional to the distance $2a-2c \cos \Phi$ by varying the angle $\Phi$, fourth means connecting said first and second means for obtaining a voltage proportional to the quotient of said products, motor means driven by said quotient voltage, said motor means having a first output for varying said voltage proportional to the distance $2r$ for balancing said products for each value of $\Phi$, said motor means having a second output indicative of the distance $2r$ for any value of $\Phi$.

7. An elliptical computer system for determining the position of an enemy submarine, comprising in combination: a first elliptical computer, a first input means for inserting into said first elliptical computer a voltage proportional to the direct distance between foci of a first ellipse, said foci of said first ellipse being the locations of a sonobuoy and a first charge dropped in sequence by an aircraft, a second input means for inserting into said first elliptical computer a voltage proportional to the difference between the distance from said first charge to said sonobuoy measured by way of a submarine and the direct distance between said sonobuoy and said first charge; a second elliptical computer, a first input means for inserting into said second elliptical computer a voltage proportional to the direct distance between foci of a second ellipse, said foci of said second ellipse being the locations of said sonobuoy and a second charge dropped by said aircraft, a second input means for inserting into said second elliptical computer a voltage proportional to the difference between the distance from said second charge to said sonobuoy measured by way of said submarine and the direct distance between said sonobuoy and said second charge, common input means for inserting into said first and said second elliptical computer a voltage proportional to the angle between a line connecting said sonobuoy and said first charge and two coincident lines extending from said sonobuoy, one of said coincident lines extending from said sonobuoy to the periphery of said first ellipse, the other of said coincident lines extending from said sonobuoy to the periphery of said second ellipse, means connected in said common input means for varying said voltage proportional to said angle from a reference equivalent to said angle being 0°, indicator means associated with said means for determining the amount of variance of said common input voltage in terms of degrees of said angle, said first elliptical computer having a voltage output proportional to the length of said one of said two coincident lines, said second elliptical computer having a voltage output proportional to the length of said other of said two coincident lines; each of said elliptical computer means including first elliptical computer means for obtaining the product of a voltage proportional to a distance $2a-2$ and a voltage proportional to a distance $2a+2c$, where $2c$ is the direct distance between foci of an ellipse and $2a$ is the distance from one of said foci to the other of said foci measured by way of a point on said ellipse, second means for obtaining the product of a voltage proportional to a distance $2r$ and of a voltage proportional to a distance $2a-2c \cos \Phi$, where $2r$ is the distance from the other of said foci to said point on said ellipse and $\Phi$ is the angle between a line connecting said foci and a line connecting said other of said foci to said point on said ellipse, third elliptical computer means for varying the voltage proportional to the distance $2a-2c \cos \Phi$ by varying the angle $\Phi$ from a 0° reference, fourth elliptical computer means connecting said first and second elliptical computer means for obtaining a voltage proportional to the quotient of said product, motor means driven by said quotient voltage, said motor means having a first output for varying said voltage proportional to the distance $2r$ for balancing said products for each value of $\Phi$, said motor means having a second output indicative of the distance $2r$ for any value of $\Phi$, comparison means connected to receive each of said elliptical computer voltage outputs, said comparison means having an output voltage of zero when said elliptical computer voltage outputs are equal, said comparison including means for indicating said zero output voltage, whereby the values of said angle for which said computer outputs are equal are shown on said indicator means.